United States Patent

Oehlerking et al.

[11] Patent Number: 6,036,207
[45] Date of Patent: Mar. 14, 2000

[54] SLIDE AXLE TRAILER

[75] Inventors: A. Dean Oehlerking; Ray E. Paradis; Harry E. Voelzke; Dale J. Dierks, all of Mitchell, S. Dak.

[73] Assignee: Dakota Mfg. Co., Mitchell, S. Dak.

[21] Appl. No.: 08/972,782

[22] Filed: Nov. 18, 1997

[51] Int. Cl.[7] ..................................................... B60P 1/04
[52] U.S. Cl. ................................... 280/149.2; 280/407.1; 414/475
[58] Field of Search ................................ 280/149.2, 781, 280/787, 788, 799, 405.1, 407.1; 414/475, 476, 474, 483, 481

[56] References Cited

U.S. PATENT DOCUMENTS

| | | | |
|---|---|---|---|
| 2,717,707 | 9/1955 | Martin | 280/407.1 |
| 4,111,450 | 9/1978 | Pinto | 280/407.1 |
| 4,125,198 | 11/1978 | Landoll | 414/484 |
| 4,132,326 | 1/1979 | Pinto | 280/149.1 |
| 4,943,202 | 7/1990 | Galloway | 414/475 |
| 4,958,845 | 9/1990 | Parks | 280/407.1 |
| 5,013,056 | 5/1991 | Landoll et al. | 280/149.2 |
| 5,211,413 | 5/1993 | Williams et al. | 280/149.2 |
| 5,667,231 | 9/1997 | Dierks et al. | 280/149.2 |
| 5,807,057 | 9/1998 | Nijenhuis | 414/475 |

*Primary Examiner*—Paul N. Dickson
*Assistant Examiner*—Lynda Jasmin
*Attorney, Agent, or Firm*—Zarley, McKee, Thomte Voorhees & Sease; Dennis L. Thomte

[57] ABSTRACT

A trailer including a longitudinally extending frame comprised of longitudinally extending frame members having rearward and forward ends. Each of the frame members has a first section modulus which is positioned forwardly of the rearward end thereof, at least a second section modulus which is positioned forwardly of the first section modulus, and a transition section modulus positioned therebetween. A running gear is longitudinally slidably mounted on the frame members and has running gear retainers mounted thereon which slidably embrace the lower end of the frame members. When the running gear is in its transport position, a spacer is provided between the running gear retainers and the frame members to prevent excessive play therebetween. The retainers are designed so that once the retainers move out of engagement with the spacers, there is sufficient play or gap between the retainers and the frame members to enable the running gear to move from the first section modulus to the second section modulus. The varying of the section modulus on the frame members enables the trailer to accommodate heavy loads without increasing the deck height or affecting the tilt angle thereof.

7 Claims, 5 Drawing Sheets

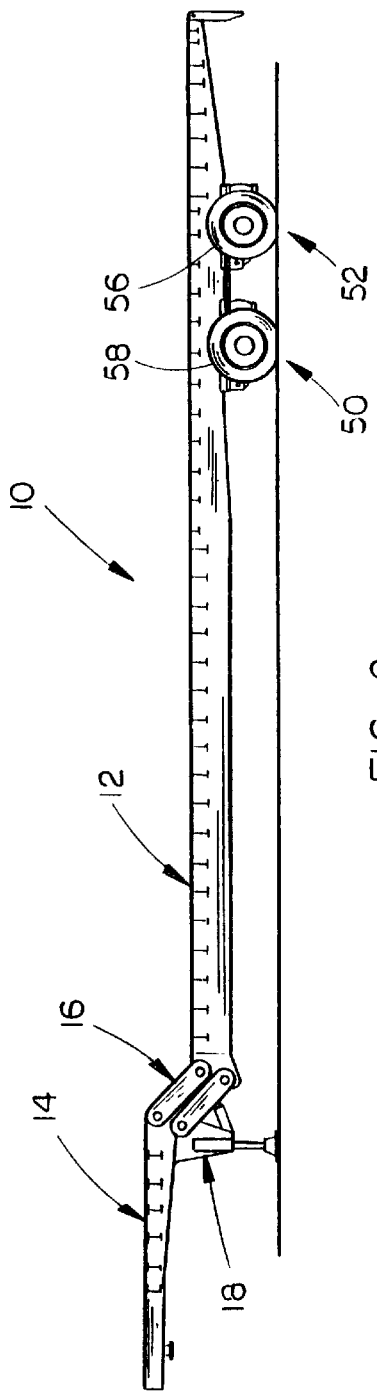
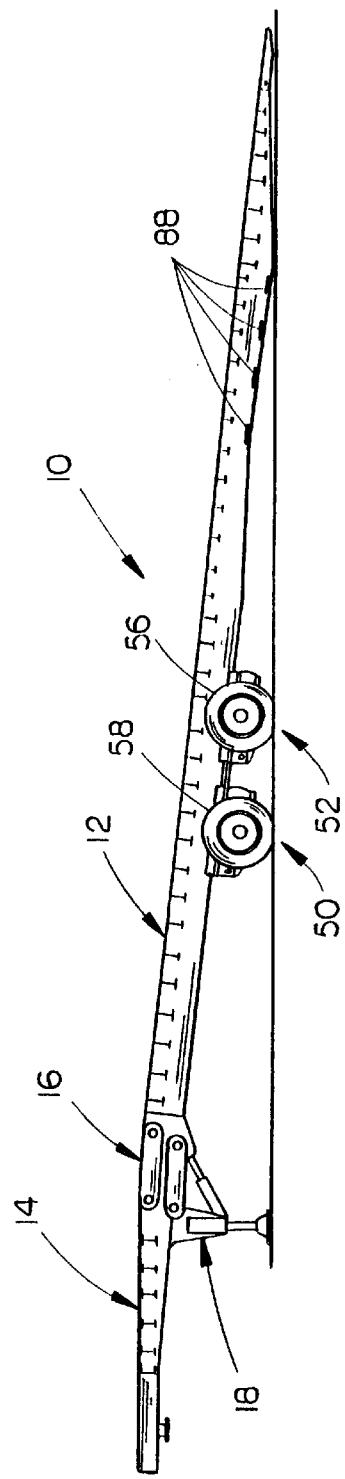
FIG. 2
FIG. 3

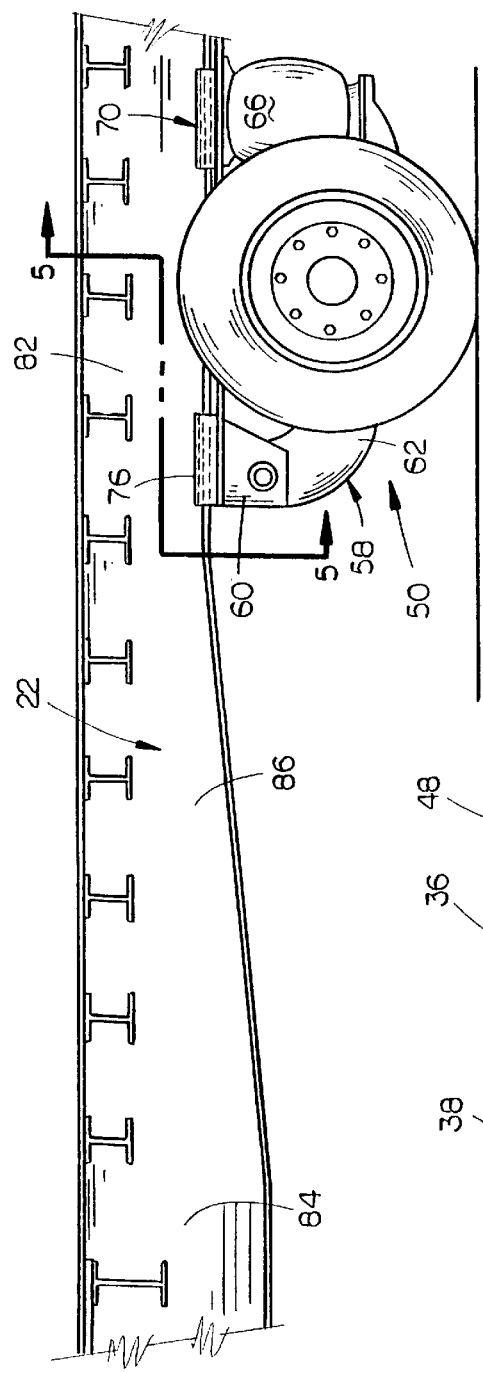
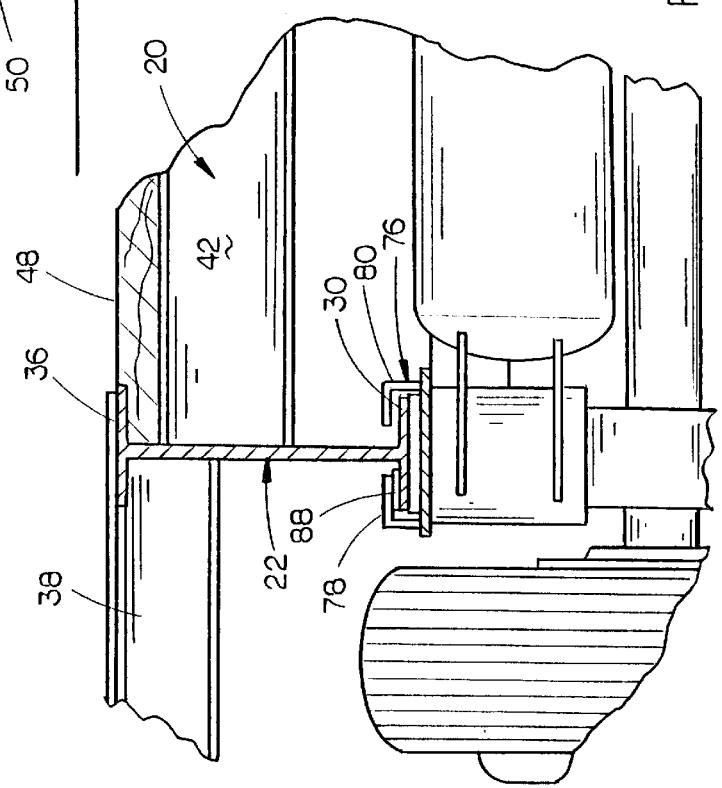
FIG. 4
FIG. 5

SLIDE AXLE TRAILER

BACKGROUND OF THE INVENTION

1. Field of the Invention

This invention relates to a trailer and more particularly to a slide axle trailer which is able to haul heavy loads without significantly increasing the deck height or load angle of the trailer.

2. Description of the Related Art

Many types of trailers have been previously provided for transporting large equipment over-the-road. The equipment is normally loaded onto the trailer from the rearward end thereof. In many cases, the bed of the trailer is tilted to move the rearward end thereof into close proximity to the ground to enable the equipment to be loaded onto the trailer or unloaded from the trailer. The problem associated with a tilting trailer bed is that the angle of the same may be large, thereby making it difficult, if not impossible, for the equipment to be loaded onto the trailer.

In an effort to solve the problems of the prior art, a low angle tilt trailer was designed and is described in U.S. Pat. No. 4,568,235, which has been assigned to the assignee of this invention. An improvement of the trailer described in U.S. Pat. No. 4,568,235 is also owned by the assignee of this invention and is described in U.S. Pat. No. 5,667,231. In U.S. Pat. No. 4,568,235, a trailer is described which represented a significant advance in the field and which included a forward frame section having a rear frame section selectively longitudinally slidably mounted on the forward frame section and which has a wheel assembly mounted at the rearward end thereof. In the device of the '235 patent, the entire rear frame section was moved forwardly to move the rear wheels forwardly to enable the trailer to tilt.

In the trailer of U.S. Pat. No. 5,667,231, the suspension system was slidably mounted on the wheeled frame which was comprised of a pair of longitudinally extending frame members. Except for the tail section of the trailer, the frame members of the trailer of the '231 patent had the same vertical height, same width, and were constructed of the same strength materials for the length thereof. Thus, in the trailer of the '231 patent, the deck height of the trailer was dictated by the height of the frame members. If the trailer of the '231 patent were going to be designed to handle extremely heavy loads, the height of the longitudinally extending frame members would have to be increased which would thereby increase the deck height or load angle of the trailer.

SUMMARY OF THE INVENTION

A slide axle trailer is disclosed which is able to haul heavy loads without significantly increasing the deck height or load angle of the trailer. To achieve such a trailer, a main frame beam is provided having varying section modulus. The section modulus is varied according to the capacity of the load that the trailer is rated to haul. The section modulus may be varied by a change in the beam height, a change in material types, or a change in the size of materials used in certain sections of the beam. To achieve the above, a running gear assembly is provided which is able to traverse a main frame beam of varying section modulus, while still having tight tolerances in the transport position.

The trailer comprises a first frame means which includes first and second elongated and longitudinally extending frame members having rearward and forward ends. Each of the frame members includes a bottom flange, an upstanding web, and a top flange. Each of the first and second frame members have a first section modulus positioned forwardly of the rearward end thereof, a second section modulus which is positioned forwardly of the first section modulus, and a transition section modulus positioned between the first section modulus and the second section modulus. A running gear assembly is longitudinally slidably mounted on each of the first and second frame members. The running gear assemblies are movable from a transport position on the first section modulus to a position forwardly thereof on the second section modulus. Each of the running gear assemblies includes a running gear retainer which slidably mounts the running gear assembly to its associated frame member. The running gear retainers have a configuration to permit the retainers and running gear assemblies to move from the first section modulus to the second section modulus and vice versa. When the running gear assemblies are in their transport position, a spacer is positioned between the running gear retainers and the associated frame member so that there is not excessive play between the running gear assembly and the frame member. The second section modulus on each of the frame members is designed to have a greater strength than the first section modulus so that the trailer is able to haul heavy loads without significantly increasing the height of the trailer. The second section modulus may be strengthened by either increasing the height of the frame member, changing the material types of the frame members, or a change in size of materials.

It is therefore a principal object of the invention to provide an improved slide axle trailer.

A further object of the invention is to provide an improved slide axle trailer which is able to haul heavy loads without significantly increasing the deck height or load angle of the trailer.

Still another object of the invention is to provide a slide axle trailer utilizing a main frame beam of varying section modulus.

Still another object of the invention is to provide a running gear assembly which is able to traverse a main frame beam of varying section modulus while still having tight tolerances in the transport position.

These and other objects will be apparent to those skilled in the art.

BRIEF DESCRIPTION OF THE DRAWINGS

FIG. 2 is a side view of the trailer of this invention with portions thereof cut away to more fully illustrate the invention;

FIG. 3 is a view similar to FIG. 2 except that the running gear assembly has been moved from the transport position to enable the rearward end of the main deck to be tilted towards ground engagement;

FIG. 4 is a partial side elevational view of the trailer of this invention with portions thereof cut away to more fully illustrate the invention and with the running gear assembly being positioned in the transport position;

FIG. 5 is an enlarged sectional view seen on lines 5—5 of FIG. 4;

DESCRIPTION OF THE PREFERRED EMBODIMENT

Figure 1:
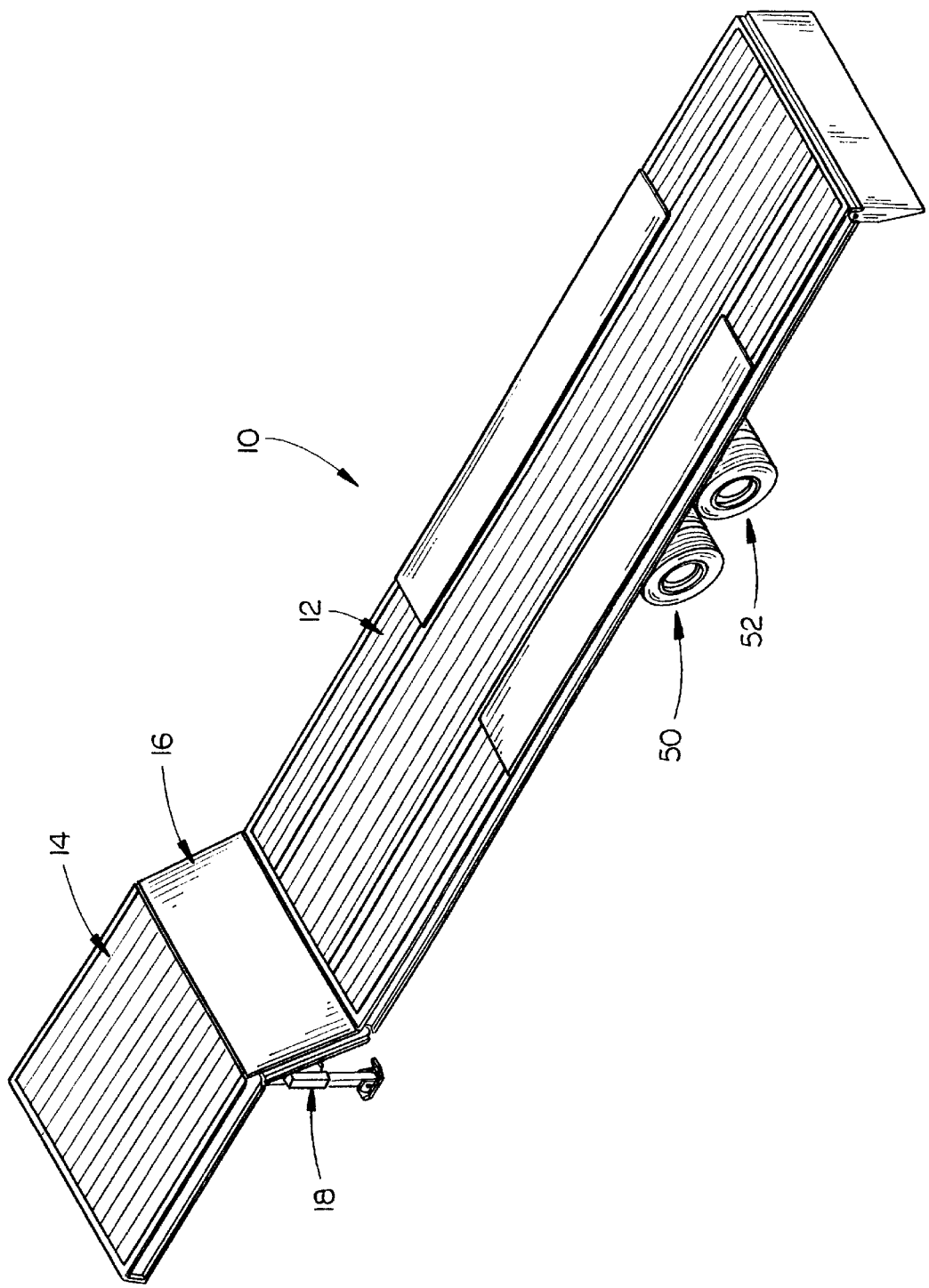
FIG. 1 is a rear perspective view of the trailer of this invention.

The trailer of this invention is referred to generally by the reference numeral 10 and is designed to be pulled by a conventional truck having a fifth-wheel trailer connection to enable to the trailer to be connected thereto. For purposes of description, trailer 10 will be described as comprising a main deck 12, upper deck 14, and deck ramp 16. It should be noted that the slide axle trailer of this invention may not have a deck ramp 16 or an upper deck 14. Upper deck 14 also includes a conventional support system 18 for supporting the trailer when the trailer is disconnected from the truck.

Figure 9:
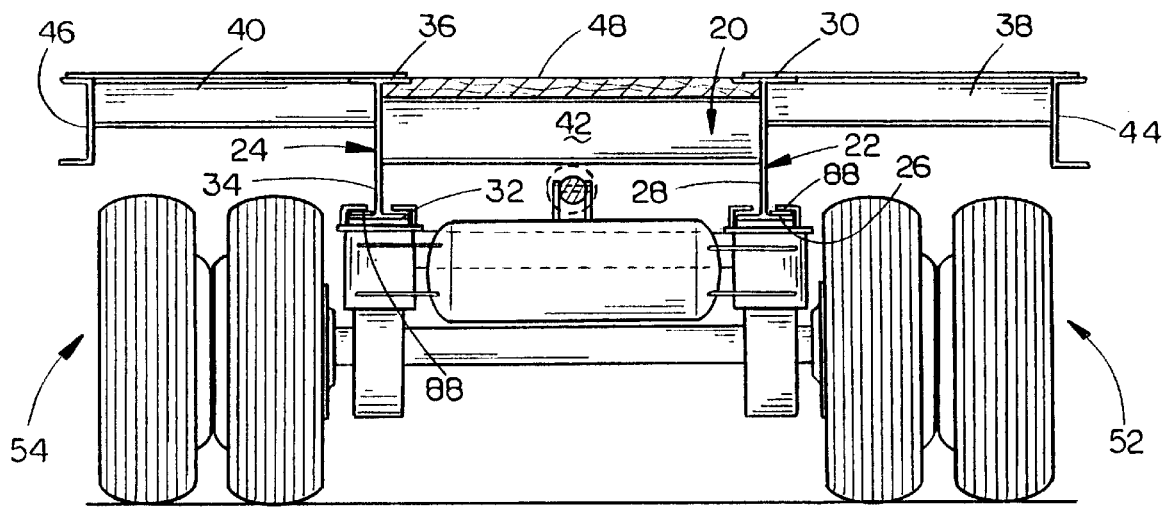
FIG. 9 is a rear elevational view illustrating the running gear assemblies in the transport position.

The numeral 20 refers generally to the frame means of the trailer and which includes a pair of longitudinally extending frame members 22 and 24 (FIG. 9). Frame member 22 includes a bottom flange 26, web 28 and top flange 30. Similarly, frame member 24 includes a bottom flange 32, web 34 and top flange 36. A plurality of transversely extending frame members 38 extend outwardly from frame member 22 while a plurality of transversely extending frame members 40 extend outwardly from frame member 24. A plurality of cross members 42 extend between the frame members 22 and 24 in a horizontally spaced condition. Channel member 44 is secured to the outer ends of the frame members 38 while channel member 46 is secured to the outer ends of frame members 40. Decking material 48 is secured to the upper surface of the main deck, as seen in FIG. 9, in conventional fashion.

Figure 10:
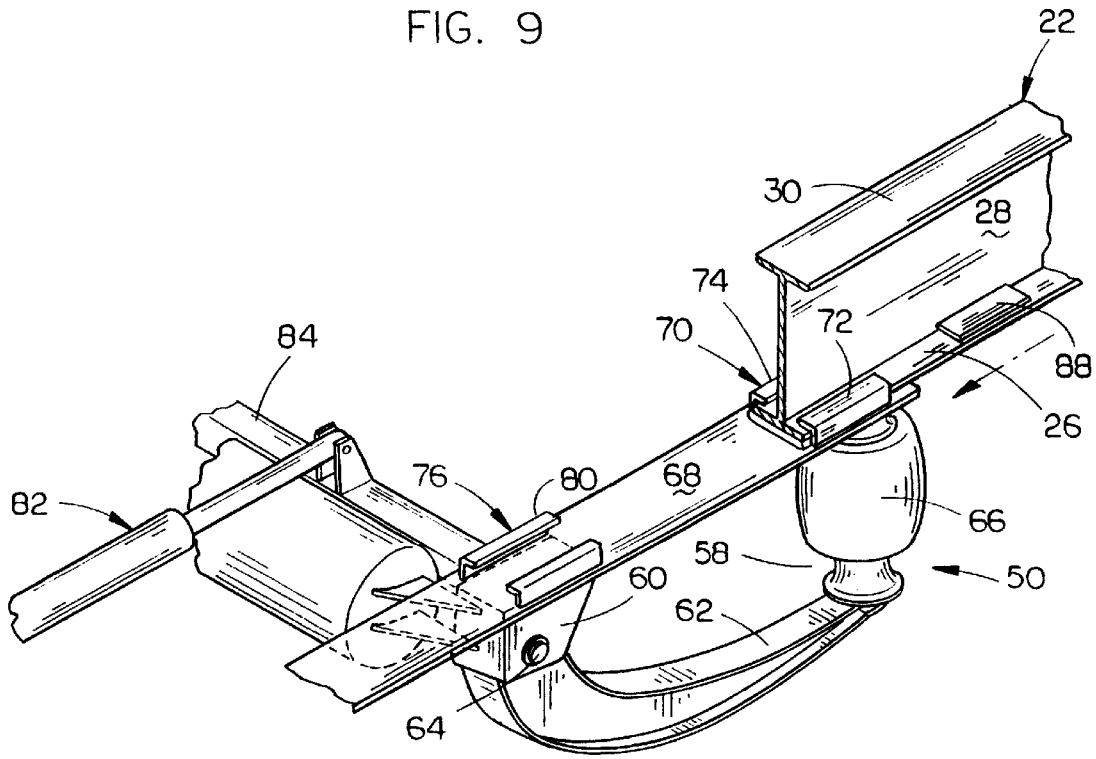
FIG. 10 is a partial exploded perspective view illustrating the relationship of the running gear assembly to the associated frame member.

The numeral 50 refers to a suspension system which is slidably mounted on the frame members 22 and 24 and which is substantially conventional in design except for the fact that it has been modified to enable it to be slidably mounted on the frame members 22 and 24. Suspension system 50 includes running gear assemblies 52 and 54 which are interconnected by suitable cross members. The running gear assemblies may be of the single axle type or double axle type, or any other number or spacing, depending upon the particular needs of the trailer. The drawings illustrate that each of the running gear assemblies are comprised of a pair of running gears which will be referred to generally by the reference numerals 56 and 58. Inasmuch as each of the running gears are identical, only running gear 58 will be described in detail. As seen in FIG. 10, running gear 58 includes a bracket 60 having a beam 62 pivotally mounted thereto by pivot pin 64. Beam 62 extends rearwardly from the pivotal connection 64 and has a shock absorber or air bag 66 positioned between the rearward end thereof and the underside of plate 68. Although an air ride suspension system is shown and described, the concept of this invention may be used with other types of suspension systems. The upper end of bracket 60 is welded to the underside of plate 68, as seen in the drawings. Running gear retainer 70 is welded to the upper surface of plate 68 and comprises retainer members 72 and 74 which extend upwardly from plate 68 and thence partially over the opposite sides of the bottom flange 26 of frame member 22. Similarly, a running gear retainer 76 is welded to the upper surface of plate 68 and comprises retainers 78 and 80 which extend upwardly from plate 68 and thence partially over the opposite sides of the bottom flange 26 of frame member 22.

A hydraulic cylinder 82 is connected to cross member 84 which interconnects the running gear assemblies on opposite sides of the trailer to enable the running gear assemblies or suspension units to be slidably moved with respect to the frame members 22 and 24. As stated, inasmuch as the running gear assemblies on opposite sides of the trailer are identical, only one side thereof will be described in detail.

Referring now to FIG. 4, frame member 22 is illustrated as having a first section modulus 82, a second section modulus 84 and an intermediate section modulus 86 positioned therebetween. As seen in FIG. 4, the vertical height of the frame member 22 is less than the height of the second section modulus 84. The intermediate section modulus 86 provides the transition between the first section modulus 82 and the second section modulus 84. The first section modulus 82 is provided at the rear of the frame member 22 and would be located immediately above the location of the running gear assembly 50 when the running gear assembly 50 is in its transport position. If the retainers 70 and 76 were designed so as to be snug-fitting on the bottom flange 26 of frame member 22 when the running gear assembly 50 is in its transport position, the running gear assembly 50 would not be able to traverse the intermediate modulus section 86 to get to the second modulus section 84. However, if the clearance or spacing between retainers 70 and 76 with respect to bottom flange 26 of frame member 22 is increased so as to permit the movement of the running gear assembly 50 from the first section modulus 82 to the second section modulus 84, that spacing or play between the retainers and the bottom flange 28 of frame member 22 when the running gear assembly is in its transport position creates many problems, such as improper tracking of the trailer, premature tire wear, and structural failures due to braking. Thus, in order to maintain the proper spacing between the running gear retainers and the bottom flange 26 of frame member 22, spacers are mounted on the bottom flange 28 of frame member 22 at the points where the retainers 70 and 76 are positioned when the running gear assembly 50 is in its transport position. Those spacers are referred to generally by the reference numeral 88.

Figure 6:
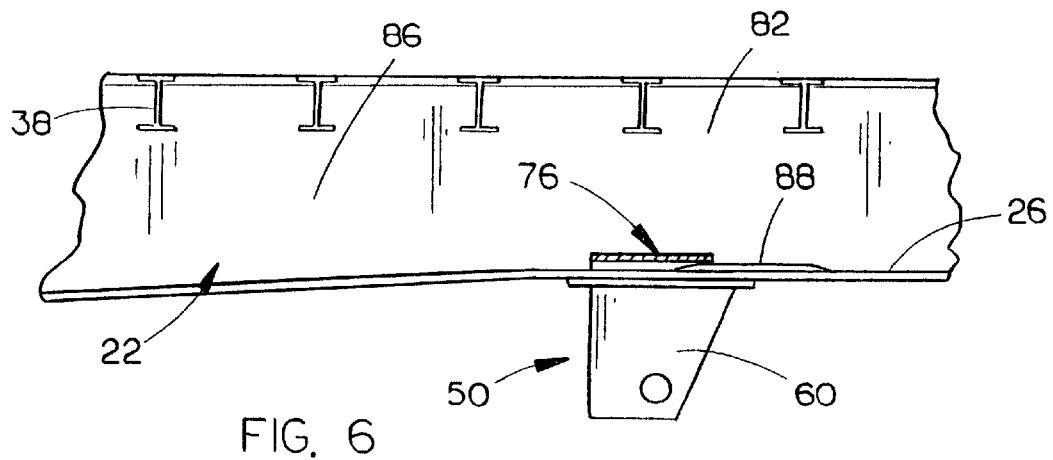
FIG. 6 is a partial sectional view illustrating one of the running gear retainers just forwardly of its transport position.
Figure 7:
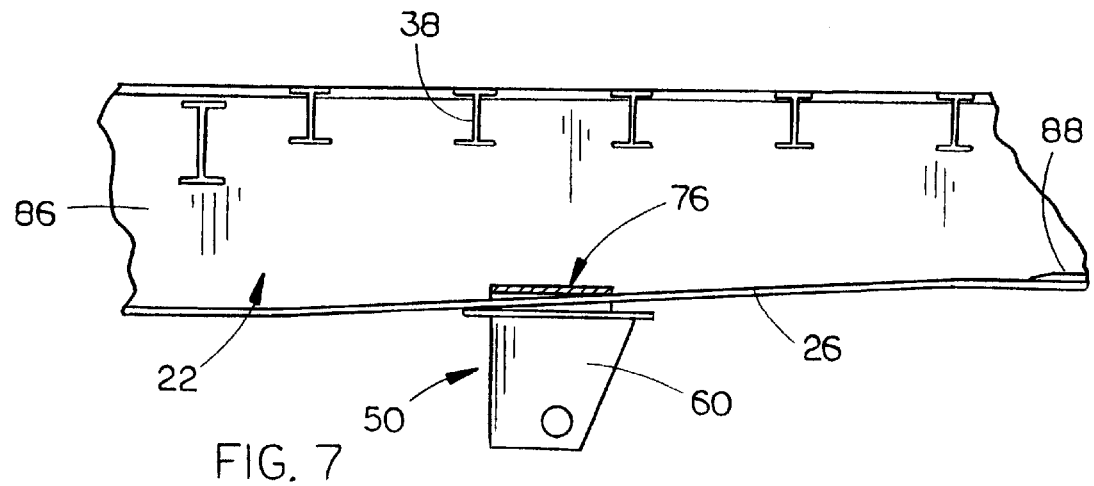
FIG. 7 is a view similar to FIG. 6 except that the retainer is illustrated transversing the intermediate section modulus which is positioned between the rear section modulus and the forward section modulus.
Figure 8:
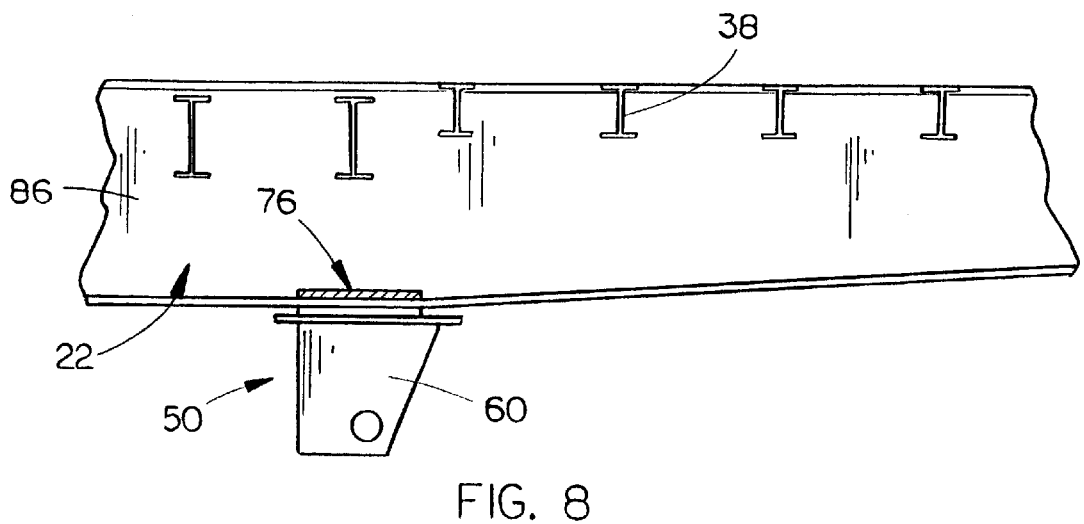
FIG. 8 is a view similar to FIG. 7 except that the retainer is shown positioned on the forward section modulus.

As an example, for a given load situation, if it was determined that the section modulus of each of the main frame members must be varied by increasing the depth of the frame members by 3.625 inches over a 48-inch area immediately in front of the transport position of the running gear, the length of the running gear retainers and the appropriate gap between the running gear retainers and the flange on the main frame beam would then be determined. These two items depend on the geometry of the transition of the main frame beam as well as being interdependent. In this example, the length of the running gear retainer was determined to be 9 inches and the gap was determined to be 0.1875 inches. The 0.1875-inch gap that is required to allow the running gear to traverse the main frame beam needs to be reduced significantly to prevent problems during transport. Thus, the spacers 88 are provided. FIG. 6 illustrates the running gear 50 moving forwardly off the forward end of the spacer 88 and about to encounter the rearward end of intermediate section modulus 86. FIG. 7 illustrates the running gear 50 having been moved onto the intermediate section modulus 86 and it can be seen that there is sufficient clearance between the retainer 76 and the bottom flange 26 of the main frame member 22 to enable a smooth transition. FIG. 8 illustrates the running gear assembly 50 having been moved from the intermediate section modulus 86 onto the rearward end of the section modulus 88.

Although it has been shown that the section modulus of the trailer has been changed from the rear end to the forward end thereof by increasing the height of the main frame beam or frame member 22, to achieve the necessary strength for load-carrying capability, without increasing the deck height, the added or increased section modulus may be varied by changing the materials being used or by changing the size of the components. For example, the thickness of the top flange, web and bottom flange of the main frame beam or frame member 22 could be increased. Additionally, the width of the main frame beam or frame member 22 could be increased.

Thus it can be seen that a novel arrangement has been described which enables the slide axle to be moved from one section modulus to another section modulus while ensuring that there will not be excessive play or an excessive gap between the running gear retainers and the main frame beams when the running gear assemblies are in their transport position.

Thus it can be seen that the invention accomplishes at least all of its stated objectives.

We claim:

1. A trailer, comprising:

a longitudinally extending frame having rearward and forward ends;

means at the forward end of said frame for connection to a prime mover;

said frame including at least first and second elongated and longitudinally extending frame members having rearward and forward ends;

each of said first and second frame members including a bottom flange, an upstanding web, and a top flange;

each of said first and second frame members having a first section modulus of a given height which is positioned forwardly of the rearward end of the associated frame member, at least a second section modulus which is positioned forwardly of and having a height differing from said height of said first section modulus, and a transition section modulus positioned between said first section modulus and said second section modulus;

at least one first running gear assembly longitudinally slidably mounted on said first frame member;

at least one second running gear assembly longitudinally slidably movably mounted on said second frame member;

said first and second running gear assemblies being movable from a transport position on said first section modulus to a position forwardly thereof on said second section modulus;

a first movement limiting means positioned on said first section modulus of said first frame member, said first movement limiting means being positioned between said bottom flange on said first frame member and said first running gear assembly to prevent excessive movement between said first running gear assembly and said first frame member when said first running gear assembly is in its transport position;

a second movement limiting means positioned on said first section modulus of said second frame member, said second movement limiting means positioned between said bottom flange on said second frame member and said second running gear assembly to prevent excessive movement between said second running gear assembly and said second frame member when said second running gear assembly is in its transport position;

means for selectively slidably moving said first and second running gear assemblies with respect to said first and second frame members;

and a deck supported on said frame.

2. The trailer of claim 1 wherein said webs of said first and second frame members have a greater height in said second section modulus than they have in said first section modulus.

3. A trailer comprising:

a longitudinally extending frame having rearward and forward ends;

means at the forward end of said frame for connection to a prime mover;

said frame including at least first and second elongated and longitudinally extending frame members having rearward and forward ends;

each of said first and second frame members including a bottom flange, an upstanding web, and a top flange;

each of said first and second frame members having a first section modulus which is positioned forwardly of the rearward end of the associated frame member, at least a second section modulus which is positioned forwardly of and having a height differing from said first section modulus, and a transition section modulus positioned between said first section modulus and said second section modulus;

at least one first running gear assembly longitudinally slidably mounted on said first frame member;

at least one second running gear assembly longitudinally slidably movably mounted on said second frame member;

said first and second running gear assemblies being movable from a transport position on said first section modulus to a position forwardly thereof on said second section modulus;

said first running gear assembly including at least a first running gear retainer which slidably mounts said first running gear assembly to said first frame member;

said second running gear assembly including at least a second running gear retainer which slidably mounts said second running gear assembly to said second frame member;

a first movement limiting means positioned on said first section modulus of said first frame member, said first movement limiting means positioned between said first frame member and said first running gear retainer to prevent excessive movement between said first running gear retainer and said first frame member when said first running gear assembly is in its transport position;

a second movement limiting means positioned on said first section modulus of said second frame member, said second movement limiting means being positioned between said second frame member and said second running gear retainer to prevent excessive movement between said second running gear retainer and said second frame member when said second running gear assembly is in its transport position;

and means for selectively slidably moving said first and second running gear assemblies with respect to said first and second frame members.

4. The trailer of claim 3 wherein said webs of said first and second frame members have a greater height in said second section modulus than they have in said first section modulus.

5. The trailer of claim 3 wherein said first and second running gear retainers having a configuration so as to permit said retainers and running gear assemblies to move from said first section modulus to said second modulus and vice versa.

6. A trailer, comprising:

a longitudinally extending frame having rearward and forward ends;

means at the forward end of said frame for connection to a prime mover;

said frame including at least first and second elongated and longitudinally extending frame members having rearward and forward ends;

each of said first and second frame members including a bottom flange, an upstanding web, and a top flange;

each of said first and second frame members having a first section modulus which is positioned forwardly of the rearward end of the associated frame member, at least a second section modulus which is positioned forwardly of said first section modulus, and a transition section modulus positioned between said first section modulus and said second section modulus;

at least one first running gear assembly longitudinally slidably mounted on said first frame member;

at least one second running gear assembly longitudinally slidably movably mounted on said second frame member;

said first and second running gear assemblies being movable from a transport position on said first section modulus to a position forwardly thereof on said second section modulus;

said first running gear assembly including at least a first running gear retainer which slidably mounts said first running gear assembly to said first frame member;

said first running gear retainer comprising a first substantially horizontally disposed plate which is positioned beneath said bottom flange of said first frame member, and retainer clips which extend upwardly from said first plate on opposite sides of said bottom flange, and thence at least partially over said bottom flange;

said second running gear assembly including at least a second running gear retainer which slidably mounts said second running gear assembly to said second frame member;

said second running gear retainer comprising a second substantially horizontally disposed plate which is positioned beneath said bottom flange of said second frame member, and retainer clips which extend upwardly from said second plate on opposite sides of said bottom flange, and thence at least partially over said bottom flange;

a first spacer positioned on said first section modulus of said first frame member, said first spacer being positioned between said bottom flange on said first frame member and said first running gear retainer to prevent excessive movement between said first running gear retainer and said first frame member when said first running gear assembly is in its transport position;

a second spacer positioned on said first section modulus of said second frame member, said second spacer being positioned between said bottom flange on said second frame member and said second running gear retainer to prevent excessive movement between said second running gear retainer and said second frame member when said second running gear assembly is in its transport position;

means for selectively slidably moving said first and second running gear assemblies with respect to said first and second frame members;

and a deck supported on said frame;

each of said spacers being positioned on the tops of said bottom flanges of said first and second frame members.

7. A trailer, comprising:

a longitudinally extending frame having rearward and forward ends;

means at the forward end of said frame for connection to a prime mover;

said frame including at least first and second elongated and longitudinally extending frame members having rearward and forward ends;

each of said first and second frame members including a bottom flange, an upstanding web, and a top flange;

each of said first and second frame members having a first section modulus which is positioned forwardly of the rearward end of the associated frame member, at least a second section modulus which is positioned forwardly of said first section modulus, and a transition section modulus positioned between said first section modulus and said second section modulus;

at least one first running gear assembly longitudinally slidably mounted on said first frame member;

at least one second running gear assembly longitudinally slidably movably mounted on said second frame member;

said first and second running gear assemblies being movable from a transport position on said first section modulus to a position forwardly thereof on said second section modulus;

said first running gear assembly including at least a first running gear retainer which slidably mounts said first running gear assembly to said second frame member;

a first spacer positioned on said first section modulus of said first frame member, said first spacer being positioned between said first frame member and said first running gear retainer to prevent excessive movement between said first running gear retainer and said first frame member when said first running gear assembly is in its transport position;

a second spacer position on said first section modulus of said second frame member, said second spacer being positioned between said second frame member and said second running gear retainer to prevent excessive movement between said second running gear retainer and said second frame member when said second running gear assembly is in its transport position;

and means for selectively slidably moving said first and second running gear assemblies with respect to said first and second frame members;

each of said spacers being positioned on the tops of said bottom flanges of said first and second frame members.

* * * * *